United States Patent
May

(10) Patent No.: US 10,400,153 B2
(45) Date of Patent: Sep. 3, 2019

(54) DRILLING FLUID FOR USE IN HORIZONTAL DIRECTIONAL DRILLING OPERATIONS

(71) Applicant: Halliburton Energy Services, Inc., Houston, TX (US)

(72) Inventor: Preston Andrew May, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/567,927

(22) PCT Filed: May 21, 2015

(86) PCT No.: PCT/US2015/031915
§ 371 (c)(1),
(2) Date: Oct. 19, 2017

(87) PCT Pub. No.: WO2016/186670
PCT Pub. Date: Nov. 24, 2016

(65) Prior Publication Data
US 2018/0118992 A1    May 3, 2018

(51) Int. Cl.
*E21B 7/04* (2006.01)
*E21B 21/00* (2006.01)
*C09K 8/12* (2006.01)
*C09K 8/04* (2006.01)

(52) U.S. Cl.
CPC .......... *C09K 8/12* (2013.01); *C09K 8/04* (2013.01); *E21B 7/046* (2013.01); *E21B 21/00* (2013.01)

(58) Field of Classification Search
CPC ........ C09K 8/685; C09K 8/512; C09K 8/887; C09K 8/62; C09K 8/12; E21B 43/26; E21B 43/267; E21B 33/138; E21B 37/00; E21B 43/25; E21B 7/046; E21B 21/003
See application file for complete search history.

(56) References Cited

U.S. PATENT DOCUMENTS

| | | |
|---|---|---|
| 3,968,093 A | 7/1976 | Hasegawa et al. |
| 5,076,373 A | 12/1991 | Hale et al. |
| 5,783,527 A | 7/1998 | Dobson, Jr. et al. |
| 5,789,349 A | 8/1998 | Patel |
| 5,975,220 A | 11/1999 | Mueller et al. |
| 6,173,778 B1 | 1/2001 | Rae et al. |
| 7,703,529 B2 | 4/2010 | Robinson et al. |
| 2009/0149353 A1 | 6/2009 | Dajani et al. |

(Continued)

FOREIGN PATENT DOCUMENTS

WO    WO-0151760 A2    7/2001

OTHER PUBLICATIONS

International Search Report and Written Opinion from PCT/US2015/031915 dated Dec. 23, 2015, 15 pages.

*Primary Examiner* — Zakiya W Bates
(74) *Attorney, Agent, or Firm* — Tenley Krueger; C. Turney Law Group PLLC

(57) ABSTRACT

Methods of circulating a drilling fluid while drilling a shallow wellbore that is highly deviated or horizontal. The drilling fluid comprises an aqueous base fluid, iota carrageenan, partially hydrolyzed polyacrylamide, and a divalent cation selected from the group consisting of a calcium ion, a magnesium ion, and any combination thereof. The shallow wellbore that is highly deviated or horizontal is no greater than about 610 meters below an earth surface, and in a range of about 55° to about 125° from a vertical inclination.

20 Claims, 1 Drawing Sheet

(56) References Cited

U.S. PATENT DOCUMENTS

2012/0028853 A1    2/2012   Masikewich
2012/0055676 A1    3/2012   Wood
2014/0014341 A1    1/2014   Hathcox et al.

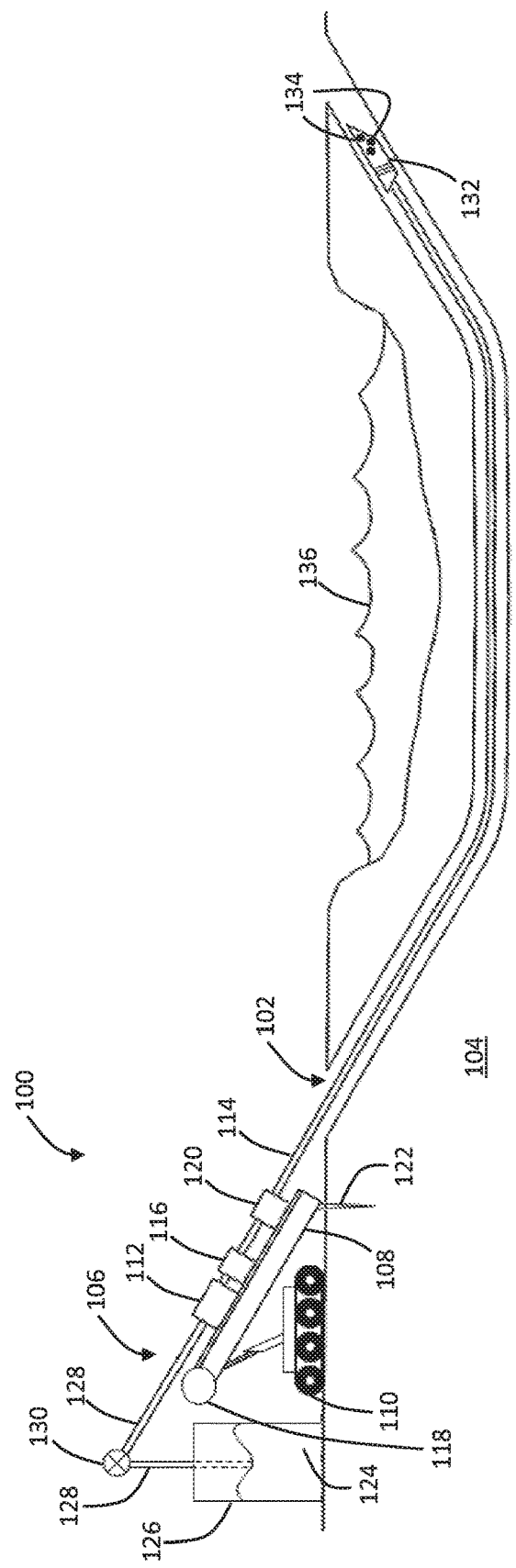

DRILLING FLUID FOR USE IN HORIZONTAL DIRECTIONAL DRILLING OPERATIONS

BACKGROUND

The embodiments herein relate generally to subterranean formation operations and, more particularly, to drilling fluids for use in horizontal directional drilling.

Horizontal directional drilling (HDD) typically employs a steerable, trenchless method for forming wellbores to install underground utilities (e.g., underground pipes, conduits, cables, and the like). Conventional directional boring techniques traditionally operate from a boring device that pushes or steers a series of connected drill strings with a directable drill bit at the distal end thereof to achieve the wellbore geometry. A water-based drilling fluid containing finely divided bentonite clay particles and/or other additives is typically used in HDD operations. The drilling fluid is pumped down the drill string(s) through the openings in the drill bit and upwardly, through the annual space between the drill string(s) and the wall of the wellbore, to the surface of the earth. One of the primary benefits of employing the drilling fluid is to suspend the cuttings produced by the drill bit during the process of boring the wellbore and to transport these cuttings to the surface of the earth. Another important function of drilling fluid is to provide a thin and impermeable filter cake on the wall of the wellbore to reduce loss of water from the wellbore to the formation. Water infiltration from the drilling fluid to the surrounding formation may cause the formation to soften, which further induces wellbore sloughing and cave in. Other advantages of drilling fluid include lubricating the bit and the drill string, cooling the bit, reducing torque and drag, and providing a hydrostatic pressure head to prevent formation fluid from flowing into the wellbore.

Accordingly, gel strength and fluid loss are two important requirements of a drilling fluid for use in horizontal directional drilling As used herein, the term "gel strength" refers to the measurement of the drilling fluid's ability to support suspended cuttings when the fluid is at rest. A drilling fluid should have sufficient gel strength in order to keep cuttings from settling. If a drilling fluid does not exhibit an adequate gel strength, cuttings in the drilling fluid tend to settle out, which may result in sliding cuttings beds, stuck drill pipe, or total loss of the wellbore. Another requirement of a drilling fluid for boring any hole, either vertically or directionally, is a low fluid loss or filtration rate as referred to in the oil and gas well drilling industry.

A drilling fluid may have sufficient gel strength to prevent settling of cuttings when circulation of the drilling fluid is stopped. However, if the drilling fluid does not have a low filter loss, it may result in the deposition of a thick filter cake on the walls of the wellbore, which may cause instability of the wellbore. When large amounts of water filter from the drilling fluid into the formation surrounding the wellbore, the solids of the drilling fluid remain as a filter cake, thus reducing the size of the annular passage. Build-up of a thick filter cake may cause the stuck drill pipe, particularly in horizontal directional drilling operations. Moreover, stuck drill pipe is an increased risk in unconsolidated formations, such as silt or sandy soil.

BRIEF DESCRIPTION OF THE DRAWINGS

The following figure is included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for drilling a shallow, highly deviated or horizontal wellbore according to one or more embodiments of the present disclosure.

DETAILED DESCRIPTION

The embodiments herein relate generally to subterranean formation operations and, more particularly, to drilling fluids for use in horizontal directional drilling.

Specifically, the embodiments of the present disclosure relate to a drilling fluid for use in a horizontal directional drilling operation that provides adequate gel strength and fluid loss control without the use of clay (e.g., bentonite). As used herein, the term "horizontal directional drilling" refers to forming a shallow (less than about 610 meters (equivalent to less than about 2000 feet) below the surface of the earth), highly deviated or horizontal wellbore (90° from a vertical inclination) that is not used for producing hydrocarbons (e.g., oil and gas). Accordingly, the wellbore formed during a horizontal directional drilling operation may be from a lower limit of about 55°, 57.5°, 60°, 62.5°, 65°, 67.5°, 70°, 72.5°, 75°, 77.5°, 80°, 82.5°, 85°, 87.5°, and 90° to an upper limit of about 125°, 122.5°, 120°, 117.5°, 115°, 112.5°, 110°, 107.5°, 105°, 102.5°, 100°, 97.5°, 95°, 92.5°, and 90° from a vertical inclination, encompassing any value and subset therebetween. Each of these values is critical to the embodiments of the present disclosure as the inclination of the wellbore may be dependent on the type of formation, the geometry of the formation, the type of equipment or utilities to be placed in the wellbore, and the like.

Traditional clay-based drilling fluids may be costly, particularly in relation to disposal requirements of the clay. Rather than relying on such clay-based drilling fluids, the embodiments of the present disclosure are directed to a sustainable, environmentally-friendly, naturally-occurring polysaccharide-based drilling fluid that provides the necessary gel strength and fluid loss control characteristics for use in a horizontal directional drilling operation.

Specifically, the embodiments described herein utilize naturally-occurring iota carrageenan, which has a large size and structure that gives it flexibility to curl into helical structures. These helical structures gives them the ability to gel aqueous base fluids at various temperatures, including room temperature and temperatures in a shallow wellbore, as described herein. Specifically, the iota carrageenan may gel aqueous base fluid, including in the presence of the additional components of the drilling fluids described herein, at temperatures in the range of a lower limit of about 0° C., 5° C., 10° C., 15° C., 20° C., 25° C., 30° C., and 35° C. to an upper limit of about 66° C., 65° C., 60° C., 55° C., 50° C., 45° C., 40° C., and 35° C. (equivalent to about 32° F. to about 150° F.), encompassing any value and subset therebetween. Each of these values is critical to the embodiments of the present disclosure and may depend on a number of factors including, but not limited to, the amount of iota carrageenan, the amount of other components in the drilling fluid, and the like. Accordingly, the drilling fluids described herein are particularly useful in shallow wellbores, including those described above for horizontal directional drilling and the shallow, highly deviated or horizontal wellbores drilled therewith, as they exhibit this range of desired temperatures for the iota carrageenan due to the shallow and deviated/horizontal nature. It will be appreciated, though, that the drilling fluids described herein may additionally be shallow vertical wellbores having the desired temperature range, without departing from the scope of the present disclosure. Wellbores that are not used for the purposes of the shallow, highly deviated or horizontal wellbores as described herein (e.g., for avoiding water tables, for laying utilities, and the like) may be used for recovery of hydrocarbons or water, which may both involve contact with a water reservoir. Iota carrageenan is readily biodegradable and may ferment in a water reservoir or upon contact with a sufficient amount of water given sufficient amount of time and cause contamination.

The gelation capacity of iota carrageenan is enhanced by crosslinks when the iota carrageenan is in the presence of certain divalent cations or salts thereof (e.g., calcium and/or magnesium ions) and partially hydrolyzed polyacrylamide (PHPA), a clay/shale stabilizer. It is well known that such divalent cations, particularly calcium ions, destroy the viscosity of the PHPA polymer. That is, such divalent cations are essentially a contaminant when used in combination with PHPA. However, this effect is not observed when both the divalent cations and the PHPA are in the presence of iota carrageenan. Without being bound by theory, it is believed that the divalent cations preferentially bind to the iota carrageenan, rather than the PHPA, thereby using the divalent cations for productive chemistry (gelation of the iota carrageenan) and not degradative chemistry (destruction of PHPA viscosity). This does not imply that no binding between the divalent cations and the PHPA occurs. Moreover, the combination of the three components further supports the introduction of bridging agents to provide filtration control due to its superior gel strength.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

In some embodiments, the present disclosure provides a horizontal directional drilling fluid (also referred to herein simply as "drilling fluid") comprising an aqueous base fluid, iota carrageenan, partially hydrolyzed polyacrylamide, and a divalent cation.

Suitable aqueous base fluids for use in the drilling fluids described herein may include, but are not limited to, fresh water, produced water (e.g., water produced as a byproduct from a hydrocarbon producing subterranean formation), wastewater (e.g., water that has been adversely affected in quality by anthropogenic influence) that has been treated or untreated, and any combination thereof. Generally, the water may be from any source, provided that it does not contain components that might adversely affect the stability and/or performance of the drilling fluids. In certain embodiments, the density of the aqueous base fluid can be adjusted, among other purposes, to provide additional gel strength to the drilling fluids. In certain embodiments, the pH of the aqueous base fluid may be adjusted (e.g., by a buffer or other pH adjusting agent) to a specific level, which may depend on, among other factors, the amounts of the various components in the drilling fluid, the types of the various components in the drilling fluid, and the like. In some embodiments, the pH range may range from a lower limit of about 4, 5, 6, 7, and 8 to an upper limit of about 11, 10, 9, and 8, encompassing any value and subset therebetween.

Iota carrageenan is a linear sulphated polysaccharide extracted from red edible seaweeds, which has two anionic sulphates per disaccharide. Iota carrageenan is widely used in the food industry, including organic and non-organic foods such as juices, chocolate milk, and infant formula. Iota carrageenan has the general molecular structure of Structure I, as follows:

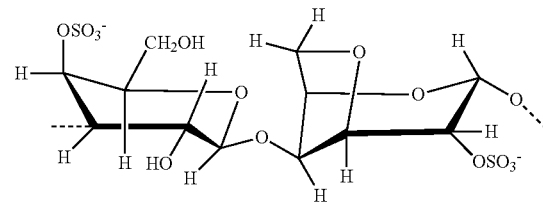

Structure I

The iota carrageenan may be derived from red seaweed by any method suitable for processing. Such methods may include, but are not limited to semi-refined processing, refined processing, mixed processing, and any combination thereof. Semi-refined processing derives the iota carrageenan from one or both of *E. cottonii* or *E. spinosum* using a hot alkali solution (e.g., about 5-8% potassium hydroxide). Refined processing involves dissolving and filtering the iota carrageenan to remove cell wall debris, followed by precipitation by isopropanol or potassium chloride. Mixed processing is a hybrid method in which the red seaweed is treated according to the semi-refined process, but alcohol or high salt levels are used to inhibit dissolution. Other methods may additionally be used in which rather than an alkali solution, the iota carrageenan is derived using an acid solution, thereby forming so-called "degraded" iota carrageenan. Accordingly, un-degraded or degraded iota carrageenan may be used according to the embodiments of the present disclosure. Typically, degraded iota carrageenan will have a reduced molecular weight due to the process used to derive it (e.g., treatment with the acid solution).

Generally, the molecular weight of the iota carrageenan for use in the drilling fluids described herein may be in the range of a lower limit of about 10000 daltons (Da), 50000 Da, 100000 Da, 150000 Da, 200000 Da, 250000 Da, 300000 Da, 350000 Da, and 400000 Da to an upper limit of about 800000 Da, 750000 Da, 700000 Da, 650000 Da, 600000 Da, 550000 Da, 500000 Da, 450000 Da, and 400000 Da, encompassing any value and subset therebetween. Each of these values is critical to the embodiments described herein and the molecular weight of the iota carrageenan may depend on a number of factors including, but not limited to, the red seaweed species used to derive the iota carrageenan, the process used to derive the iota carrageenan (e.g., contact with an alkali versus acidic solution), and the like.

The iota carrageenan for use in the embodiments of the present disclosure may be present in the drilling fluid described herein in an amount 0.25 pounds per barrel (lb/bbl), 0.5 lb/bbl, 0.75 lb/bbl, 1 lb/bbl, 1.25 lb/bbl, 1.5 lb/bbl, 1.75 lb/bbl, 2 lb/bbl, 2.25 lb/bbl, and 2.5 lb/bbl to an upper limit of about 5 lb/bbl, 4.75 lb/bbl, 4.5 lb/bbl, 4.25 lb/bbl, 4 lb/bbl, 3.75 lb/bbl, 3.5 lb/bbl, 3.25 lb/bbl, 3 lb/bbl, 2.75 lb/bbl, and 2.5 lb/bbl, encompassing any value and subset therebetween. One lb/bbl is equivalent to 2.854 kilograms per cubic meter ($kg/m^3$). Each of these values is critical to the embodiments of the present disclosure and the amount of iota carrageenan included in the drilling fluid may depend on a number of factors including, but not limited to, the molecular weight of the iota carrageenan selected, the amount and type of other components in the drilling fluid, the desired gelation, and the like.

The drilling fluids of the present disclosure comprise a partially hydrolyzed polyacrylamide (PHPA). In some embodiments, the hydrolysis percentage of the PHPA may be in the range of a lower limit of about 5%, 7.5%, 10%, 12.5%, 15%, 17.5%, 20%, 22.5%, and 25 to an upper limit of about 50%, 47.5%, 45%, 42.5%, 40%, 37.5%, 35%, 32.5%, 30%, 27.5%, and 25%, encompassing any value and subset therebetween. For example, in some embodiments, the hydrolysis percentage of the PHPA may be in the range of from about 20% to about 40%, encompassing any value and subset therebetween. Each of these values is critical to the embodiments of the present disclosure and may depend on a number of factors including, but not limited to, the desired gel strength, the amount of intramolecular crosslinking desired, and the like. The PHPA of the present disclosure may be in either an acid form or a salt form (e.g., sodium salt form), without departing from the scope of the present disclosure.

The molecular weight of the PHPA, in some embodiments, may be in the range of a lower limit of about 10000 Da, 100000 Da, 1000000 Da, 2000000 Da, 3000000 Da, 4000000 Da, 5000000 Da, 6000000 Da, 7000000 Da, 8000000 Da, 9000000 Da, and 10000000 Da to an upper limit of about 20000000 Da, 19000000 Da, 18000000 Da, 17000000 Da, 16000000 Da, 15000000 Da, 14000000 Da, 13000000 Da, 12000000 Da, 11000000 Da, and 10000000 Da, encompassing any value and subset therebetween. Each of these values is critical to the embodiments of the present disclosure and the may depend on a number of factors including, but not limited to, the desired gel strength, the desired water-solubility, and the like.

In some embodiments, the PHPA may be present in the drilling fluids described herein in an amount in the range of a lower limit of about 0.05 lb/bbl, 0.1 lb/bbl, 0.25 lb/bbl, 0.5 lb/bbl, 0.75 lb/bbl, 1 lb/bbl, 1.25 lb/bbl, 1.5 lb/bbl, 1.75 lb/bbl, 2 lb/bbl, 2.25 lb/bbl, and 2.5 lb/bbl to an upper limit of about 5 lb/bbl, 4.75 lb/bbl, 4.5 lb/bbl, 4.25 lb/bbl, 4 lb/bbl, 3.75 lb/bbl, 3.5 lb/bbl, 3.25 lb/bbl, 3 lb/bbl, 2.75 lb/bbl, and 2.5 lb/bbl, encompassing any value and subset therebetween. Each of these values is critical to the embodiments of the present disclosure and may depend on a number of factors including, but not limited to, the hydrolysis percentage of the PHPA, the molecular weight of the PHPA, the type and amount of divalent cation selected, the amount of iota carrageenan selected, and the like.

The divalent cations for use in the embodiments of the present disclosure may interact with the iota carrageenan to crosslink the iota carrageenan and form a gel structure. As used herein, the term "divalent cation" refers to an ion having a positive charge and a valence=2; the term encompasses the divalent cations alone, salts thereof, and compounds capable of providing the divalent cation. Suitable divalent cations may include, but are not limited to, a calcium ion, a magnesium ion, and any combination thereof. In some embodiments, the divalent cation for use in the drilling fluid described herein may be provided by a compound including, but not limited to, calcium chloride, magnesium chloride, calcium sulfide, magnesium sulfide, calcium selenide, magnesium selenide, calcium oxide, magnesium oxide, calcium fluoride, magnesium fluoride, calcium bromide, magnesium bromide, calcium iodide, magnesium iodide, calcium citrate, magnesium citrate, and any combination thereof. As used herein, the term "divalent cation" encompasses both ions themselves and compounds capable of supplying the ion(s), unless specifically stated otherwise.

In some embodiments, the divalent cation may be present in the drilling fluids of the present disclosure in an amount in the range of from a lower limit of about 5 weight percent (wt %), 7.5 wt %, 10 wt %, 12.5 wt %, 15 wt %, 17.5 wt %, 20 wt %, 22.5 wt %, and 25 wt % to an upper limit of about 50 wt %, 47.5 wt %, 45 wt %, 42.5 wt %, 40 wt %, 37.5 wt %, 35 wt %, 32.5 wt %, 30 wt %, 27.5 wt %, and 25 wt % relative to the iota carrageenan weight, encompassing any value and subset therebetween. Each of these values is critical to the embodiments of the present disclosure and the amount of divalent cation may depend on a number of factors including, but not limited to, the type of divalent cation selected, whether the divalent cation is itself an ion or a compound capable of providing the ion, the amount of desired gelation, and the like.

In some embodiments, the drilling fluid may further comprise a filtration control agent. The filtration control agents serve to manage filtration rates and reduce filter cake permeability within a formation. In addition to filtration control, the filtration control agents described herein may additionally affect bridging, bonding, deflocculation, and viscosity. Suitable filtration control agents may be any substance capable of performing the above mentioned actions in a subterranean formation, provided that they do not affect the performance of the drilling fluids or components therein as described in the present disclosure. Examples of suitable filtration control agents may be a solid particulate including, but are not limited to, calcium carbonate, a latex polymer, graphite, dolomite, mica, sand, ceramic, crystalline silica, amorphous silica, and any combination thereof.

In some embodiments, the filtration control agent solid particulates may have an average particle size distribution (d50) in the range of a lower limit of about 1 µm, 10 µm, 20 µm, 30 µm, 40 µm, 50 µm, 60 µm, 70 µm, 80 µm, 90 µm, and 100 µm to an upper limit of about 200 µm, 190 µm, 180 µm, 170 µm, 160 µm, 150 µm, 140 µm, 130 µm, 120 µm, 110 µm, and 100 µm, encompassing any value and subset therebetween. Each of these values is critical to the embodiments of the present disclosure and may depend on a number of factors including, but not limited to, the amount of filtration control desired, the size and geometry of the shallow, highly deviated or horizontal wellbore, the type of subterranean formation, and the like.

The filtration control agent, when included in the drilling fluids described herein, may be present in the range of from a lower limit of about 0.1 lb/bbl, 0.5 lb/bbl, 1 lb/bbl, 1.5 lb/bbl, 2 lb/bbl, 2.5 lb/bbl, 3 lb/bbl, 3.5 lb/bbl, 4 lb/bbl, 4.5 lb/bbl, and 5 lb/bbl to an upper limit of about 10 lb/bbl, 9.5 lb/bbl, 9 lb/bbl, 8.5 lb/bbl, 8 lb/bbl, 7.5 lb/bbl, 7 lb/bbl, 6.5 lb/bbl, 6 lb/bbl, 5.5 lb/bbl, and 5 lb/bbl, encompassing any value and subset therebetween. Each of these values is critical to the embodiments of the present disclosure and may depend on a number of factors including, but not limited to, the type and size of the filtration control agent, the amount of filtration control desired, the size and geometry of the shallow, highly deviated or horizontal wellbore, the type of subterranean formation, and the like.

In some embodiments, the drilling fluid described herein may be circulated during the drilling of a shallow, highly deviated or horizontal wellbore. As used herein, the term "circulated," and grammatical variants thereof (e.g., "circulating," "circulation," "circulate," and the like) refers to turbulent fluid flow. As described in more detail below, the circulation of the drilling fluid may be due to its expulsion from a drill bit as the shallow, highly deviated or horizontal wellbore is being drilled. In some embodiments, the same drilling fluid may be re-used more than once during the drilling of the shallow, highly deviated or horizontal wellbore. That is, the drilling fluid may in some instances be used during the drilling of the shallow, highly deviated or horizontal wellbore and once the drilling fluid resurfaces, it is collected (e.g., in a retention pit) and not re-used in the same shallow, highly deviated or horizontal wellbore. In other embodiments, however, the drilling fluid may resurface and then be treated, such as to remove unwanted solids (e.g., drill cuttings) or chemicals and re-used either in the same shallow, highly deviated or horizontal wellbore (e.g., to clean the wellbore), or in any other subterranean formation operation (e.g., drilling of another shallow, highly deviated or horizontal wellbore, a fracturing operation, and the like).

In various embodiments, systems configured for drilling a shallow, highly deviated or horizontal wellbore using the drilling fluid disclosed herein are described. In various embodiments, the systems can comprise a horizontal drilling apparatus comprising a drill string having a first end and a second end. The first end of the drill string may be operably connectable to a drive system and the second end of the drill string may be operably connectable to a drill head. The drill head may have one or more fluid ports therethrough. The drill string is further fluidly connectable to a pump through a tubular for pumping the drilling fluid through the tubular, into the drill string, and out the drill head during a drilling operation.

Referring now to FIG. 1, illustrated is a horizontal drilling system 100 configured for drilling a shallow, highly deviated or horizontal wellbore 102 in a subterranean formation 104 using the drilling fluid described herein. It will be appreciated that the horizontal drilling system 100 is illustrative only, and various additions or changes may be made to the horizontal drilling system 100, without departing from the scope of the present disclosure. Non-limiting additional components that may be present include, but are not limited to, valves, adapters, joints, gauges, sensors, compressors, pressure controllers, pressure sensors, flow rate controllers, flow rate sensors, and the like.

The horizontal drilling system 100 of FIG. 1 are not necessarily drawn to scale, and the various components of the system 100 may be of different sizes than shown and relative to other components of the system 100, without departing from the scope of the present disclosure.

As shown, the system 100 may include a horizontal drilling apparatus 106. The horizontal drilling apparatus 106 may include a frame 108, which may be on wheels 110, as shown, for transport. However, it will be appreciated that the horizontal drilling apparatus 106 may have a flat base for contact with the surface of the earth, be mounted on a truck, or otherwise positioned for a drilling operation, without departing from the scope of the present disclosure. A carriage 112 is slidably on the frame 108 and holds drill string 114. The carriage 112 may hold the drill string 114 at an angle, such as between about 0° to about 25°, in some embodiments. A motor 116 is operably connectable to the carriage 112 for providing power to supply the drill string 114 during a drilling operation. The motor 116, in some embodiments may provide hydraulic power. A chain drive 118 (or rack-and-pinion drive) is used to push or pull the carriage 112 and advance or retract the drill string 114. The carriage 112, motor 116, and chain drive 118 may be collectively referred to as a "drive system." As used herein, the term "drive system" refers to a mechanism as part of a horizontal drilling apparatus that advances or retracts drill string during a horizontal directional drilling operation. An optional guide 120 may be included as part of the horizontal drilling apparatus 106 to steady the drill string 114 as it is retracted or advanced. A stake 122 may be used to hold the horizontal drilling apparatus 106 in place.

Drilling fluid 124, such as the drilling fluid described in the present disclosure, may be supplied in a tank 126 for delivery into the drill string 114 through a tubular 128 fluidly connected to a pump 130. In some embodiments, the tank 126 may be used to formulate the drilling fluid 124 (e.g., mix the components together), which may include a mixer therein (not shown). In other embodiments, the systems described herein can further comprise a mixing tank that is upstream of the tank 126 in which the treatment fluids are formulated, and thereafter the formulated drilling fluid 124 may be conveyed to the tank 126. In other embodiments, however, the treatment fluids may be formulated offsite and transported to a worksite, in which case the drilling fluid 124 may be introduced to the tank 126 directly from its shipping container (e.g., a truck, a railcar, a barge, or the like) or from a transport pipeline. In either case, the drilling fluid 124 may be drawn into the pump 130 through the tubular 128, and then introduced into the drill string 114 for performing a drilling operation.

The pump 130 may be a high pressure pump in some embodiments. As used herein, the term "high pressure pump" will refer to a pump that operates at a pressure of about 1000 psi or greater. Suitable high pressure pumps will be known to one having ordinary skill in the art and may include, but are not limited to, floating piston pumps and positive displacement pumps. In other embodiments, the pump 130 may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular, without departing from the scope of the present disclosure.

While a first end of the drill string 114 is operably connectable to the hydraulic, as shown, a second end of the drill string 114 is operably connectable to a drill head 132 comprising fluid ports 134. As shown, the drill head 132 comprises three fluid ports 134. However, any greater or lesser number of fluid ports, provided at least one fluid port is located thereon, may be on the drill head, without departing from the scope of the present disclosure. Moreover, the positioning of the fluid ports on the drill head may be at any location on the drill head (upper portion, lower portion, back portion, front portion, throughout, and the like), and the positioning of the fluid ports relative to one another (when there are more than one) may be uniform or random, without departing from the scope of the present disclosure.

Accordingly, drilling fluid 124 is delivered to the drill string 114 from tank 126 through tubular 128 using pump 130. The drilling fluid 124 is then ejected from the fluid port(s) 134 as the drill head 132 rotates or is otherwise cutting through the subterranean formation 104 to form the shallow, highly deviated or horizontal wellbore 102. As depicted, the shallow, highly deviated or horizontal wellbore 102 is traversing a water reservoir 136; however, the shallow, highly deviated or horizontal wellbore 102, as discussed above, may be drilled to traverse roads, houses, or any other structure, without departing from the scope of the present disclosure.

Embodiments disclosed herein include:

Embodiment A: A method comprising: providing a drilling fluid comprising an aqueous base fluid, iota carrageenan, partially hydrolyzed polyacrylamide, and a divalent cation selected from the group consisting of a calcium ion, a magnesium ion, and any combination thereof; circulating the drilling fluid while drilling a shallow, highly deviated or horizontal wellbore, wherein the shallow, highly deviated or horizontal wellbore is no greater than about 610 meters below an earth surface, and in a range of about 55° to about 125° from a vertical inclination.

Embodiment A may have one or more of the following additional elements in any combination:

Element A1: Wherein the iota carrageenan is present in the drilling fluid in a range of from about 0.25 lb/bbl to about 5 lb/bbl of the drilling fluid.

Element A2: Wherein the partially hydrolyzed polyacrylamide has a hydrolysis percentage in a range of from about 5% to about 50%.

Element A3: Wherein the partially hydrolyzed polyacrylamide is present in the drilling fluid in an amount in a range of from about 0.05 lb/bbl to about 5 lb/bbl of the drilling fluid.

Element A4: Wherein the divalent cation is provided by a compound selected from the group consisting of calcium chloride, magnesium chloride, calcium sulfide, magnesium sulfide, calcium selenide, magnesium selenide, calcium oxide, magnesium oxide, calcium fluoride, magnesium fluoride, calcium bromide, magnesium bromide, calcium iodide, magnesium iodide, calcium citrate, magnesium citrate, and any combination thereof.

Element A5: Wherein the divalent cation or a compound providing the divalent cation is present in the drilling fluid in a range of about 5 weight percent of the iota carrageenan to about 50 weight percent of the iota carrageenan.

Element A6: Wherein the drilling fluid further comprises a filtration control agent.

Element A7: Wherein the drilling fluid further comprises a filtration control agent, and wherein the filtration control agent is a solid particulate selected from the group consisting of calcium carbonate, a latex polymer, graphite, dolomite, mica, sand, ceramic, crystalline silica, amorphous silica, and any combination thereof.

Element A8: Wherein the drilling fluid further comprises a filtration control agent, and wherein the filtration control agent is present in the drilling fluid in a range of from about 0.1 lb/bbl to about 10 lb/bbl of the drilling fluid.

By way of non-limiting example, exemplary combinations applicable to A include: A with A1, A4, and A8; A with A3, A4, A6, and A7; A with A1, A2, A3, A4, A5, A6, A7, and A8; A with A2, A5, A6, and A8; A with A1, A2, and A6; and the like.

Embodiment B: A horizontal directional drilling fluid comprising: an aqueous base fluid; iota carrageenan present in the drilling fluid in an amount in a range of from about 0.25 lb/bbl to about 5 lb/bbl of the drilling fluid; partially hydrolyzed polyacrylamide present in the drilling fluid in a range of from about 0.05 lb/bbl to about 5 lb/bbl of the drilling fluid; and a divalent cation selected from the group consisting of a calcium ion, a magnesium ion, and any combination thereof, wherein the divalent cation or a compound providing the divalent cation is present in the drilling fluid in a range of about 5 weight percent of the iota carrageenan to about 50 weight percent of the iota carrageenan.

Embodiment B may have one or more of the following additional elements in any combination:

Element B1: Wherein the partially hydrolyzed polyacrylamide has a hydrolysis percentage in a range of from about 5% to about 50%.

Element B2: Wherein the divalent cation is provided by a compound selected from the group consisting of calcium chloride, magnesium chloride, calcium sulfide, magnesium sulfide, calcium selenide, magnesium selenide, calcium oxide, magnesium oxide, calcium fluoride, magnesium fluoride, calcium bromide, magnesium bromide, calcium iodide, magnesium iodide, calcium citrate, magnesium citrate, and any combination thereof.

Element B3: Wherein the drilling fluid further comprises a filtration control agent.

Element B4: Wherein the drilling fluid further comprises a filtration control agent, and wherein the filtration control agent is a solid particulate selected from the group consisting of calcium carbonate, a latex polymer, graphite, dolomite, mica, sand, ceramic, crystalline silica, amorphous silica, and any combination thereof.

Element B5: Wherein the drilling fluid further comprises a filtration control agent, and wherein the filtration control agent is present in the drilling fluid in a range of from about 0.1 lb/bbl to about 10 lb/bbl of the drilling fluid.

By way of non-limiting example, exemplary combinations applicable to B include: B with B1, B3, and B5; A with A1, A2, A3, A4, and A5; A with A3, A4, and A5; A with A3 and A5; A with A1 and A4; A with A1 and A2; A with A2, A4, and A5; and the like.

Embodiment C: A system comprising: a horizontal drilling apparatus comprising a drill string having a first end and a second end, wherein the first end is operably connectable to a drive system and the second end is operably connectable to a drill head comprising at least one fluid port; and a pump fluidly connectable to the drill string through a tubular, the tubular having drilling fluid therein, wherein the drilling fluid comprises an aqueous base fluid, iota carrageenan, partially hydrolyzed polyacrylamide, and a divalent cation selected from the group consisting of a calcium ion, a magnesium ion, and any combination thereof.

Embodiment C may have one or more of the following additional elements in any combination:

Element C1: Wherein the iota carrageenan is present in the drilling fluid in a range of from about 0.25 lb/bbl to about 5 lb/bbl of the drilling fluid.

Element C2: Wherein the partially hydrolyzed polyacrylamide has a hydrolysis percentage in a range of from about 5% to about 50%.

Element C3: Wherein the partially hydrolyzed polyacrylamide is present in the drilling fluid in an amount in a range of from about 0.05 lb/bbl to about 5 lb/bbl of the drilling fluid.

Element C4: Wherein the divalent cation is provided by a compound selected from the group consisting of calcium chloride, magnesium chloride, calcium sulfide, magnesium sulfide, calcium selenide, magnesium selenide, calcium oxide, magnesium oxide, calcium fluoride, magnesium fluoride, calcium bromide, magnesium bromide, calcium iodide, magnesium iodide, calcium citrate, magnesium citrate, and any combination thereof.

Element C5: Wherein the divalent cation or a compound providing the divalent cation is present in the drilling fluid in a range of about 5 weight percent of the iota carrageenan to about 50 weight percent of the iota carrageenan.

Element C6: Wherein the drilling fluid further comprises a filtration control agent.

Element C7: Wherein the drilling fluid further comprises a filtration control agent, and wherein the filtration control agent is a solid particulate selected from the group consisting of calcium carbonate, a latex polymer, graphite, dolomite, mica, sand, ceramic, crystalline silica, amorphous silica, and any combination thereof.

Element C8: Wherein the drilling fluid further comprises a filtration control agent, and wherein the filtration control agent is present in the drilling fluid in a range of from about 0.1 lb/bbl to about 10 lb/bbl of the drilling fluid.

Element C9: Wherein the first end of the drill string is operably connected to a drive system for advancing the drill string through a subterranean formation to form a wellbore oriented greater than about 55° from a vertical inclination.

By way of non-limiting example, exemplary combinations applicable to C include: C with C1, C4, C5, and C9; C with C3, C6, C7, and C8; C with C1, C2, C3, C4, C5, C6, C7, C8, and C9; C with C1, C4, C5, and C8; C with C3, C5, and C9; C with C7, C8, and C9; and the like.

To facilitate a better understanding of the embodiments of the present disclosure, the following examples of representative embodiments are given. In no way should the following examples be read to limit, or to define, the scope of the embodiments described herein.

EXAMPLE 1

In this example, drilling fluids were prepared and tested for its suspension properties. Four drilling fluids (DF1, DF2, DF3, and DF4) were prepared according to Table 1 below, comprising only iota carrageenan and, in some instances, calcium chloride ($CaCl_2$) (divalent cation). In Table 1, the symbol "-- " means that the component was not included in the drilling fluid.

|  | Iota Carrageenan (lb/bbl) | $CaCl_2$ (lb/bbl) |
|---|---|---|
| DF1 | 1 | — |
| DF2 | 1 | 0.25 |
| DF3 | 2 | — |
| DF4 | 2 | 0.5 |

Rheology data was obtained using a FANN® 35A Viscometer with an R1-B1-F1 rotor-bob-torsion spring combination at 21° C. (70° F.) by measuring the shear stress of the bob at shear rates between 3 rpm to 600 rpm (units: lb/100 ft$^2$), determining the apparent viscosity (AV) (units: centipoise (cP)), determining the plastic viscosity (PV) (units: cP), the yield point (YP) (units: lb/100 ft$^2$), and the YP/PV value (unitless ratio). The AP is equivalent to one-half of the 600 rpm reading. The PV is determined by subtracting the 300 rpm dial reading from the 600 rpm dial reading. The YP is determined by subtracting the PV from the 300 rpm dial reading. The Yz is determined by multiplying the 3 rpm shear stress readying by two and then subtracting the 6 rpm shear stress.

The 10 second (s) gel, 10 minute (min), and 30 min gel strengths were measured by allowing the drilling fluids to remain static for 10 s, 10 min, or 30 min, respectively, and, then, measuring the maximum deflection at 3 rpm with the FANN® 35A Viscometer (units: lb/100 ft$^2$).

The LPLT (low pressure low temperature) fluid loss of the drilling fluids was measured at 7.5 min and 30 min at ambient temperature and 100 psi differential pressure (pressurized air), and reported as the 7.5 min filtrate and the 30 min filtrate (units: milliliters (mL)). The test was performed on a FANN® Series 300 LPLT full area filter press using 3.5" diameter specialty hardened filter paper from FANN (part number 206051) The fluids to be tested were added to the filter cell, sealed, and pressurized to 100 psi. As soon as the cell was pressurized, time measurements and filtration volumes began.

The rheology and fluid loss results are reported in Table 2 below.

TABLE 2

|  | DF1 | DF2 | DF3 | DF4 |
|---|---|---|---|---|
| 600 rpm | 16 | 29 | 37 | 96 |
| 300 rpm | 8.5 | 21 | 23.5 | 77 |
| 200 rpm | 6 | 18 | 18 | 68 |
| 100 rpm | 3 | 13 | 11 | 52 |
| 6 rpm | 0.5 | 5 | 1 | 24 |
| 3 rpm | 0 | 4 | 1 | 22 |
| AP | 8 | 14.5 | 18.5 | 48 |
| PV | 7.5 | 8 | 13.5 | 19 |
| YP | 1 | 13 | 10 | 58 |
| YP/PV | 0.13 | 1.62 | 0.74 | 3.05 |
| 10 s gel | 0 | 5 | 1 | 25 |
| 10 min gel | 0.5 | 38 | 1 | 83 |
| 30 min gel | 1 | 43 | 1.5 | 85 |
| 7.5 min filtrate | — | 90 | — | 20 |
| 30 min filtrate | — | 1.5 | — | 30 |

As shown, DF1 and DF3, having no divalent cation, showed very little suspension/carrying capacity, as demonstrated by their low shear viscosities, yield points, and gel strengths. Conversely, the addition of the divalent cation, even in small amounts, resulted in a gelling effect and a subsequent increase in their low shear viscosities, yield points, and gel strengths. Accordingly, the crosslinked derivative of iota carrageenan in the presence of a divalent cation (here $CaCl_2$) behaves as an exemplary suspension additive.

EXAMPLE 2

In this example, drilling fluids were prepared according to the embodiments described herein and tested for its suspension properties. Two drilling fluids (DF5 and DF6) were prepared according to Table 3 below, comprising iota carrageenan, in some instances, calcium chloride ($CaCl_2$) (divalent cation), and PHPA with a molecular weight of 1000000 Da.

TABLE 3

| | Iota Carrageenan (lb/bbl) | $CaCl_2$ (lb/bbl) | PHPA (lb/bbl) |
|---|---|---|---|
| DF5 | 1 | — | 0.42 |
| DF6 | 1 | 0.25 | 0.42 |

Rheology and fluid loss measurements for DF5 and DF6 were performed according to the methodology in Example 1. The results are reported in Table 4 below. The term "blowout" means that the entire volume of fluid passed through the filter paper during the fluid loss test.

TABLE 4

| | DF5 | DF6 |
|---|---|---|
| 600 rpm | 32.5 | 34 |
| 300 rpm | 20.5 | 24 |
| 200 rpm | 16 | 20 |
| 100 rpm | 10 | 14 |
| 6 rpm | 1 | 4 |
| 3 rpm | 0.5 | 3 |
| AP | 16.25 | 17 |
| PV | 12 | 10 |
| YP | 8.5 | 14 |
| YP/PV | 0.71 | 1.4 |
| 10 s gel | 1 | 3.5 |
| 10 min gel | 1 | 22 |
| 30 min gel | 1 | 22 |
| 7.5 min filtrate | — | — |
| 30 min filtrate | — | blowout |

As shown, the presence of the PHPA resulted in increased suspension/carrying capacity based on the rheological results, as compared to the iota carrageenan alone or the iota carrageenan with the divalent cation only (i.e., DF5 v. DF1 and DF6 v. DF2). The addition of the PHPA in the presence or absence of the divalent cation resulted in somewhat similar viscosities at high shear rate, but the low shear rates show increased viscosities, yield points, and gel strengths, all of which are beneficial to a drilling fluid for use in the embodiments described herein.

EXAMPLE 3

In this example, drilling fluids were prepared according to the embodiments described herein and tested for its suspension properties. Two drilling fluids (DF7 and DF8) were prepared according to Table 5 below, comprising iota carrageenan, in some instances, calcium chloride ($CaCl_2$) (divalent cation), PHPA, and calcium carbonate ($CaCO_3$) (filtration control agent). The filtration control agent had an average particle size distribution (d50) of about 5 μm.

TABLE 5

| | Iota Carrageenan (lb/bbl) | $CaCl_2$ (lb/bbl) | PHPA (lb/bbl) | CaCO3 (lb/bbl) |
|---|---|---|---|---|
| DF7 | 1 | — | 0.42 | 2 |
| DF8 | 1 | 0.25 | 0.42 | 2 |

Rheology and fluid loss measurements for DF7 and DF8 were performed according to the methodology in Example 1. The results are reported in Table 6 below.

TABLE 6

| | DF7 | DF8 |
|---|---|---|
| 600 rpm | 30.5 | 31 |
| 300 rpm | 20 | 22.5 |
| 200 rpm | 15.5 | 18 |
| 100 rpm | 10 | 13 |
| 6 rpm | 1 | 3 |
| 3 rpm | 0.5 | 2.5 |
| AP | 15.25 | 15.5 |
| PV | 10.5 | 8.5 |
| YP | 9.5 | 14 |
| YP/PV | 0.904762 | 1.647059 |
| 10 s gel | 1 | 3.5 |
| 10 min gel | 1 | 20 |
| 30 min gel | 1 | 20 |
| 7.5 min filtrate | — | 11.5 |
| 30 min filtrate | — | 23 |

As shown, addition of the divalent cation increases the suspension capacity of the drilling fluid, and allows introduction of a filtration control agent. Accordingly, the blowout seen in the 30 min filtrate of DF6 in Table 4 is controllable using the filtration control agent, as seen in DF8, having a 7.5 and 30 min filtrate of 11.5 and 23, respectively. Accordingly, the drilling fluid formulation has qualities of clay/shale stabilization with the PHPA, filtration control with the filtration control agent, adequate viscosity, yield point, and gel strength, all of which are beneficial to a drilling fluid for use in the embodiments described herein.

EXAMPLE 4

In this example, drilling fluids prepared according to the embodiments described herein were compared to traditional drilling fluids comprising standard polymer viscosifying agents. Two drilling fluids (DF9 and DF10) were prepared according to Table 7 below, comprising either (1) iota carrageenan, calcium chloride ($CaCl_2$) (divalent cation), and PHPA, or (2) xanthan (traditional polymer viscosifying agent and PHPA.

TABLE 7

| | Iota Carrageenan (lb/bbl) | $CaCl_2$ (lb/bbl) | PHPA (lb/bbl) | Xanthan (lb/bbl) |
|---|---|---|---|---|
| DF9 | — | — | 0.42 | 1 |
| DF10 | 1 | 0.25 | 0.42 | — |

Rheology measurements for DF9 and DF10 were performed according to the methodology in Example 1. The results are reported in Table 8 below.

TABLE 8

|         | DF9   | DF10 |
|---------|-------|------|
| 600 rpm | 42.5  | 34   |
| 300 rpm | 31    | 24   |
| 200 rpm | 26    | 20   |
| 100 rpm | 20    | 14   |
| 6 rpm   | 7.5   | 4    |
| 3 rpm   | 7     | 3    |
| AP      | 21.25 | 17   |
| PV      | 11.5  | 10   |
| YP      | 19.5  | 14   |
| YP/PV   | 1.7   | 1.4  |
| 10 s gel| 8     | 3.5  |
| 10 min gel | 9  | 22   |
| 30 min gel | 9  | 22   |

As shown, DF10 formulated according to the embodiments described herein demonstrates superior gel strengths, as well as lower viscosities without compromising yield point, as compared to the traditional drilling fluid. Accordingly, the drilling fluids of the present disclosure exhibit adequate qualities for use as a drilling fluid according to the embodiments described herein.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method for drilling a wellbore for laying utilities, the method comprising:
   providing a drilling fluid comprising an aqueous base fluid, iota carrageenan, partially hydrolyzed polyacrylamide, and a divalent cation selected from the group consisting of a calcium ion, a magnesium ion, and any combination thereof;
   circulating the drilling fluid while drilling a shallow, highly deviated or horizontal wellbore,
   wherein the shallow, highly deviated or horizontal wellbore is no greater than about 30 meters below an earth surface, and in a range of about 55° to about 125° from a vertical inclination.

2. The method of claim 1, wherein the iota carrageenan is present in the drilling fluid in a range of from about 0.25 lb/bbl to about 5 lb/bbl of the drilling fluid.

3. The method of claim 1, wherein the partially hydrolyzed polyacrylamide has a hydrolysis percentage in a range of from about 5% to about 50%.

4. The method of claim 1, wherein the partially hydrolyzed polyacrylamide is present in the drilling fluid in an amount in a range of from about 0.05 lb/bbl to about 5 lb/bbl of the drilling fluid.

5. The method of claim 1, wherein the divalent cation is provided by a compound selected from the group consisting of calcium chloride, magnesium chloride, calcium sulfide, magnesium sulfide, calcium selenide, magnesium selenide, calcium oxide, magnesium oxide, calcium fluoride, magnesium fluoride, calcium bromide, magnesium bromide, calcium iodide, magnesium iodide, calcium citrate, magnesium citrate, and any combination thereof.

6. The method of claim 1, wherein the divalent cation or a compound providing the divalent cation is present in the drilling fluid in a range of about 5 weight percent of the iota carrageenan to about 50 weight percent of the iota carrageenan.

7. The method of claim 1, wherein the drilling fluid further comprises a filtration control agent.

8. The method of claim 7, wherein the filtration control agent is a solid particulate selected from the group consisting of calcium carbonate, a latex polymer, graphite, dolomite, mica, sand, ceramic, crystalline silica, amorphous silica, and any combination thereof.

9. The method of claim 7, wherein the filtration control agent is present in the drilling fluid in a range of from about 0.1 lb/bbl to about 10 lb/bbl of the drilling fluid.

10. A horizontal directional drilling fluid comprising:
    an aqueous base fluid;
    iota carrageenan present in the drilling fluid in an amount in a range of from about 0.25 lb/bbl to about 5 lb/bbl of the drilling fluid;
    partially hydrolyzed polyacrylamide present in the drilling fluid in a range of from about 0.05 lb/bbl to about 5 lb/bbl of the drilling fluid; and
    a divalent cation selected from the group consisting of a calcium ion, a magnesium ion, and any combination thereof,
        wherein the divalent cation or a compound providing the divalent cation is present in the drilling fluid in a range of about 5 weight percent of the iota carrageenan to about 50 weight percent of the iota carrageenan; and
    wherein the horizontal directional drilling fluid is disposed about 30 meters or less below an earth surface.

11. The horizontal directional drilling fluid of claim 10, wherein the partially hydrolyzed polyacrylamide has a hydrolysis percentage in a range of from about 5% to about 50%.

12. The horizontal directional drilling fluid of claim 10, wherein the divalent cation is provided by a compound selected from the group consisting of calcium chloride, magnesium chloride, calcium sulfide, magnesium sulfide, calcium selenide, magnesium selenide, calcium oxide, magnesium oxide, calcium fluoride, magnesium fluoride, calcium bromide, magnesium bromide, calcium iodide, magnesium iodide, calcium citrate, magnesium citrate and any combination thereof.

13. The horizontal directional drilling fluid of claim 10, further comprising a filtration control agent.

14. The horizontal directional drilling fluid of claim 13, wherein the filtration control agent is a solid particulate selected from the group consisting of calcium carbonate, a latex polymer, graphite, dolomite, mica, sand, ceramic, crystalline silica, amorphous silica, and any combination thereof.

15. The horizontal directional drilling fluid of claim 13, wherein the filtration control agent is present in the drilling fluid in a range of from about 0.1 lb/bbl to about 10 lb/bbl of the drilling fluid.

16. A system comprising:
a horizontal drilling apparatus comprising a drill string having a first end and a second end, wherein the horizontal drilling apparatus is disposed about 30 meters or less below an earth surface,
wherein the first end is operably connectable to a drive system and the second end is operably connectable to a drill head comprising at least one fluid port; and
a pump fluidly connectable to the drill string through a tubular, the tubular having drilling fluid therein,
wherein the drilling fluid comprises an aqueous base fluid, iota carrageenan, partially hydrolyzed polyacrylamide, and a divalent cation selected from the group consisting of a calcium ion, a magnesium ion, and any combination thereof.

17. The system of claim 16, wherein the first end of the drill string is operably connected to a drive system for advancing the drill string through a subterranean formation to form a wellbore oriented greater than about 55° from a vertical inclination.

18. The system of claim 16, wherein the iota carrageenan is present in the drilling fluid in an amount in the range of from about 0.25 lb/bbl to about 5 lb/bbl of the drilling fluid.

19. The system of claim 16, wherein the partially hydrolyzed polyacrylamide is present in the drilling fluid in an amount in the range of from about 0.05 lb/bbl to about 5 lb/bbl of the drilling fluid.

20. The system of claim 16, wherein the divalent cation or a compound providing the divalent cation is present in the drilling fluid in the range of about 5 weight percent of the iota carrageenan to about 50 weight percent of the iota carrageenan.

* * * * *